UNITED STATES PATENT OFFICE.

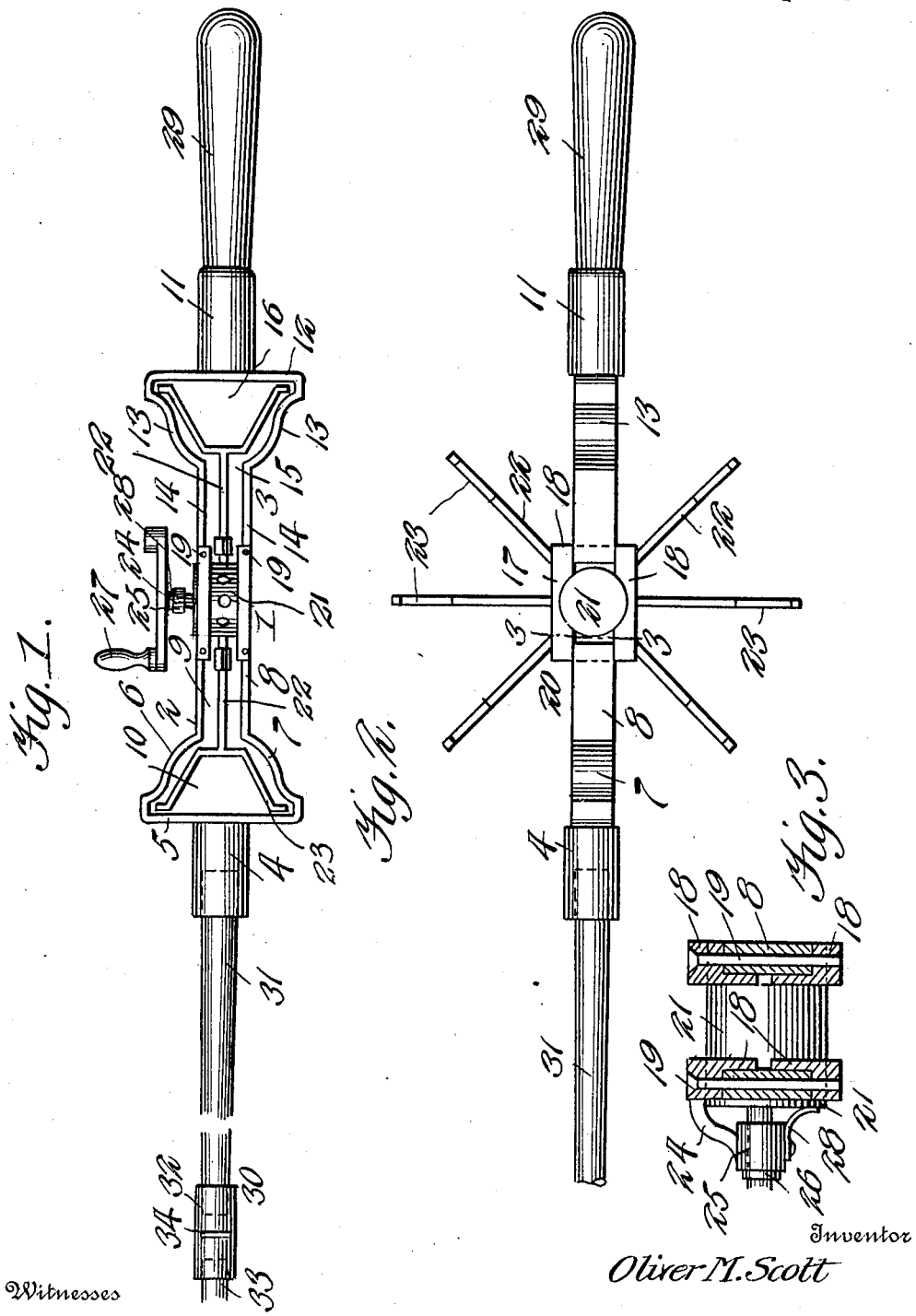

OLIVER M. SCOTT, OF KOKOMO, INDIANA.

COMBINED FISHING ROD AND REEL.

970,356.  Specification of Letters Patent.  Patented Sept. 13, 1910.

Application filed July 24, 1909. Serial No. 509,264.

*To all whom it may concern:*

Be it known that I, OLIVER M. SCOTT, a citizen of the United States, residing at Kokomo, in the county of Howard and State of Indiana, have invented new and useful Improvements in Combined Fishing Rods and Reels, of which the following is a specification.

This invention relates to a combined fishing rod and reel, and has for an object to provide a frame or support for operatively receiving the reel and provided with oppositely extending alining socket members one of which being arranged to receive the handle of a rod and the other to receive one of the sectional parts of the rod.

A still further object of my invention resides in the fact that the reel when in its operative position will lie in line with the draft line and in a plane longitudinal to the rod so that in unreeling the line it will be effectively held against tangling.

Other objects and advantages will be apparent as the nature of the invention is better set forth, and it will be undertsood that changes within the scope of the claim may be resorted to without departing from the spirit of the invention.

In the drawing, forming a portion of this specification and in which like numerals of reference indicate similar parts in the several views:—Figure 1 is a plan view of my improved fishing rod and reel, parts being removed to clearly disclose the invention. Fig. 2 is a side elevation. Fig. 3 is a detail section taken on the line 3—3 of Fig. 2.

Referring now more particularly to the drawing, there is shown a reel support or frame 1 comprising members 2 and 3 having their inner ends disposed in spaced relation to each other as shown in Fig. 2. The member 2 consists of a socket or sleeve 4 provided with a head 5 which is formed with arcuate portions 6 and 7 from which extend parallel spaced arms 8. The construction is such that a slot 9 is formed between the arms 8, and this slot is in communication with a slot or passage 10 between the arcuate portions 6 and 7 which extend from the head 5. The member 3 is provided with a socket or sleeve 11 which carries a head 12 from which extends arcuate portions 13 provided with outwardly extending arms 14 disposed in line with the arms 8 of the portions 6 and 7. The construction of the member 3 is such that a slot 15 is formed between the arms 14 and disposed in line with the slot 9 between the arms 8. The member 3 is also provided with a slot or passage 16 similar to the passage 10 between the arcuate portions 6 and 7. The arms 8 and 14 at each side have each secured thereto a pair of box forming elements 17 which are provided with outwardly extending flanges 18 which are disposed in spaced relation to each other and adapted to straddle the arms 8 and 14 as clearly illustrated in Fig. 3, and these flanges and the arms 8 and 14 are provided with alining passages for receiving clamping or retaining bolts 19.

A reel 20 is illustrated particularly in Figs. 1 and 2 and comprises a hub 21 which is mounted at its ends in the box forming elements 18 and this hub has secured thereto a plurality of radial arms 22 which are provided with forked outer end portions 23 which conforms in shape to the passages 10 and 16 hereinbefore described. One of the box forming elements 18 has secured thereto an arm 24 which is provided with a bearing hub 25 in which is revolubly mounted a stub shaft 26 which extends from one end of the hub 21. The stub shaft 26 is provided with the usual form of operating handle 27. The bearing hub 25 as shown in Fig. 3 has secured thereto in any suitable manner one end of a brake spring 28, the other end of said spring being yieldingly engaged with one of the end faces of the hub 21 and is provided to obviate a rapid unwinding of the line from the reel.

The socket or sleeve 11 receives the inner extremity of a handle 29. A portion of a rod 30 is illustrated in Fig. 1 and the section 31 has its inner end removably mounted in the socket or sleeve 4 and at the outer end this section has removably engaged therewith a coupling or sleeve 32 with which is also adapted to be engaged one end of another rod section 33. The coupling is provided with a vertically extending guide eye 34 through which the line can be threaded as will be readily understood.

The construction of the combined rod and reel as herein described and shown is such as will permit the rod sections to be readily detached from each other and the entire device folded in a compact manner when not in use. By arranging the reel 20 in a direct line with the draft line, it will be apparent that I provide a very effective structure, which will be found extremely so in the winding and unwinding operation or casting of a line.

I claim:—

As a new article of manufacture, a combined fishing rod and reel comprising identically formed companion frame members, socket members extending from the outer extremities of the frame members and arranged in line with each other, a rod having one of its ends fitted in one of the socket members, a handle fitted in the other socket member, spaced arms extending from the frame members and arranged in a plane with each other, companion pairs of box-forming elements connecting the extremities of the arms and holding them spaced from each other, a hub revolubly supported by the said box-forming elements and provided with a plurality of radial arms adapted for movement between the arms of the said frame members, an operating handle supported by the hub, an auxiliary bearing supported by one of the said box-forming elements and arranged immediately opposite the said hub, a stub shaft supported by the hub and mounted in the said auxiliary bearing, a leaf spring supported by the said auxiliary bearing and yieldingly engaged at its free end with one of the end faces of the hub to retard the rotary movement thereof, and retaining bolts passing through the extremities of the arms of the said frame members and through the extremities of the said box-forming elements.

In testimony whereof I affix my signature in presence of two witnesses.

OLIVER M. SCOTT.

Witnesses:
 FRANK CUNNINGHAM,
 FRED L. COUGHLIN.